US010235026B2

United States Patent
Taki et al.

(10) Patent No.: US 10,235,026 B2
(45) Date of Patent: Mar. 19, 2019

(54) VEHICLE OPERATION DISPLAY DEVICE

(71) Applicant: YAZAKI CORPORATION, Tokyo (JP)

(72) Inventors: Kouji Taki, Shizuoka (JP); Takahiro Shimada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/881,768

(22) Filed: Oct. 13, 2015

(65) Prior Publication Data

US 2016/0110067 A1     Apr. 21, 2016

(30) Foreign Application Priority Data

Oct. 17, 2014   (JP) ................. 2014-212240

(51) Int. Cl.
  *G06F 3/0484*   (2013.01)
  *G09G 3/36*     (2006.01)
  (Continued)

(52) U.S. Cl.
  CPC ........ *G06F 3/04842* (2013.01); *G06F 3/0362* (2013.01); *G06F 3/1431* (2013.01);
  (Continued)

(58) Field of Classification Search
  CPC combination set(s) only.
  See application file for complete search history.

(56) References Cited

U.S. PATENT DOCUMENTS 5,677,708 A * 10/1997 Matthews, III ....... G06F 3/0482
                                                      348/E5.104
2005/0091615 A1    4/2005 Suzuki
(Continued)

FOREIGN PATENT DOCUMENTS

DE    10 2010 042 326 A1    5/2011
JP        2004-102497 A     4/2004
(Continued)

OTHER PUBLICATIONS

Japanese Office Action for the related Japanese Patent Application No. 2014-212240 dated Aug. 24, 2017.
(Continued)

*Primary Examiner* — Robin J Mishler
(74) *Attorney, Agent, or Firm* — Kenealy Vaidya LLP

(57) ABSTRACT

A vehicle operation display device includes a liquid crystal display, a display controller configured to control the liquid crystal display to display a plurality of images of selectable items on the liquid crystal display, and a directional switch operable to select one of the selectable items. The plurality of images of selectable items includes a first image of a first selectable item and a second image of a second selectable image. The first image and the second image are displayed next to each other on the liquid crystal display. The display controller is configured to control the liquid crystal display to display, when the directional switch is operated to switch a selected item from the first selectable item to the second selectable item, a motion image between the first image and the second image to indicate the switching of the selected item with a moving effect.

14 Claims, 6 Drawing Sheets

(51) Int. Cl.
 *G06F 3/0362* (2013.01)
 *G06F 3/14* (2006.01)
(52) U.S. Cl.
 CPC .......... *G09G 3/36* (2013.01); *G09G 2340/12* (2013.01); *G09G 2340/14* (2013.01); *G09G 2380/10* (2013.01)

(56) References Cited

U.S. PATENT DOCUMENTS

| | | | |
|---|---|---|---|
| 2006/0017585 A1* | 1/2006 | Lenneman | B60K 35/00 340/691.6 |
| 2007/0126698 A1 | 6/2007 | Iwamoto et al. | |
| 2007/0220431 A1 | 9/2007 | Nakamura et al. | |
| 2008/0066013 A1* | 3/2008 | Brodersen | G06F 3/04817 715/836 |
| 2008/0086704 A1* | 4/2008 | Aravamudan | G06F 3/0236 715/854 |
| 2009/0138823 A1* | 5/2009 | Bradea | G06F 3/04817 715/835 |
| 2010/0257484 A1 | 10/2010 | Nakamura et al. | |
| 2011/0109541 A1 | 5/2011 | Kitagawa et al. | |
| 2013/0046397 A1* | 2/2013 | Fadell | F24F 11/0009 700/83 |
| 2013/0166146 A1* | 6/2013 | Tanaka | G06F 3/0488 701/36 |
| 2014/0319232 A1* | 10/2014 | Gourlay | F24F 11/0086 236/51 |
| 2015/0074603 A1 | 3/2015 | Abe et al. | |
| 2016/0103319 A1* | 4/2016 | Remillard | G02B 27/01 345/1.3 |

FOREIGN PATENT DOCUMENTS

| | | |
|---|---|---|
| JP | 2004-243834 A | 9/2004 |
| JP | 2007-153194 A | 6/2007 |
| JP | 2007-164298 A | 6/2007 |
| JP | 2009-196594 A | 9/2009 |
| JP | 3164748 U | 12/2010 |
| JP | 2011-100415 A | 5/2011 |
| JP | 2011-191917 A | 9/2011 |
| JP | 2013-129352 A | 7/2013 |
| JP | 2013-242610 A | 12/2013 |
| JP | 2014-2791 A | 1/2014 |

OTHER PUBLICATIONS

Japanese Office Action for the related Japanese Patent Application No. 2014-212240 dated Mar. 6, 2018.
German Office Action for the related German Patent Application No. 102015220199.6 dated Feb. 7, 2018.

\* cited by examiner

VEHICLE OPERATION DISPLAY DEVICE

CROSS-REFERENCE TO RELATED APPLICATIONS

The present application claims priority from Japanese Patent Application No. 2014-212240 filed on Oct. 17, 2014, the entire content of which is incorporated herein by reference.

FIELD OF INVENTION

The present invention relates to a vehicle operation display device mounted on a vehicle and controlling contents displayed on a liquid crystal display in accordance with an operation from an operator.

RELATED ART

Vehicle display devices are mounted on vehicles to provide information to a person on a vehicle by means of images displayed on a liquid crystal display. Some vehicle display devices are configured to display information of air conditioner settings to provide the information to a person on a vehicle (see, e.g., JP2009-196594A).

Liquid crystal displays are sometimes provided to display a plurality of images of selectable items. For example, when the liquid crystal display is provided to display air conditioner settings, a temperature setting image, an air volume image, and an air sending direction image are displayed as the images of the selectable items. A user can select one of the selectable items by operating an operating portion, and can change the selected item by a further operation. For example, the user can select the temperature setting by operating the operating portion, and change the temperature setting by further operating the operating portion.

However, according to related art vehicle operation display devices, when the operating portion is operated to switch the selected item from the currently selected item to another selectable item displayed next to the currently selected item, no information is displayed to provide a feeling of the operation. That is, it is difficult to visually give the feeling of the operation to a user who operates the operating portion.

This is not limited to a case when selecting one of selectable items associated with the air conditioner settings, but also in other case when selecting one of other selectable items (e.g., items associated with destinations in a navigator).

SUMMARY

Illustrative aspects of the present invention provide a vehicle operation display device that can visually provide a feeling of operation.

According to an illustrative aspect of the present invention, a vehicle operation display device a liquid crystal display, a display controller configured to control the liquid crystal display to display a plurality of images of selectable items on the liquid crystal display, and a directional switch operable to select one of the selectable items. The plurality of images of selectable items includes a first image of a first selectable item and a second image of a second selectable image. The first image and the second image are displayed next to each other on the liquid crystal display. The display controller is configured to control the liquid crystal display to display, when the directional switch is operated to switch a selected item from the first selectable item to the second selectable item, a motion image between the first image and the second image to indicate the switching of the selected item with a moving effect.

DETAILED DESCRIPTION

Hereinafter, exemplary embodiments of the present invention will be described in detail with reference to the drawings. However, the following exemplary embodiments do not limit the scope of the claimed invention.

Figure 1:
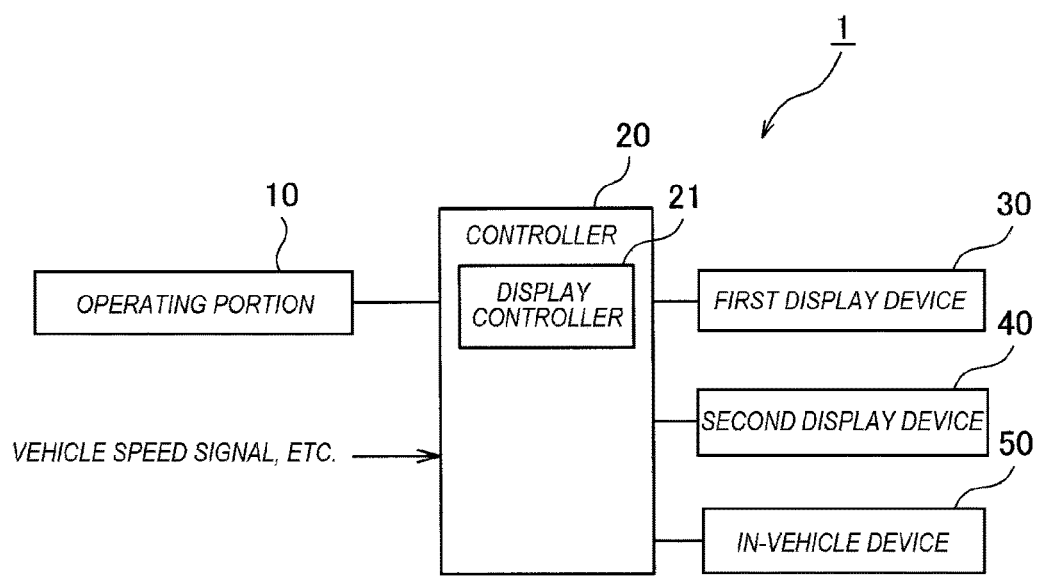
FIG. 1 is a block diagram of a vehicle operation display device according to an exemplary embodiment of the present invention.

FIG. 1 is a block diagram of a vehicle operation display device according to an exemplary embodiment of the present invention. The vehicle operation display device 1 shown in FIG. 1 is mounted on a vehicle to control display contents in accordance with an operation by an operator. The vehicle operation display device 1 has an operating portion 10, a controller 20, a first display device 30, a second display device 40, and an in-vehicle device 50.

The operating portion 10 is configured to be operated by a person on a vehicle and to send an operation signal to the controller 20 based on the operation by the person on the vehicle. The controller 20 has a display controller 21 configured to control the contents displayed on the first display device 30 and/or the second display devices 40 based on the operation signal input to the controller 20.

The first display device 30 is configured as, for example, a vehicle meter device having a thin film transistor liquid crystal display (TFT-LCD, an example of a liquid crystal display). The display controller 21 controls the first display device 30 to display information indicating vehicle physical quantities of the vehicle, such as a vehicle speed and an engine speed of the vehicle, and attention attracting information such as various kinds of warning.

Figure 2:
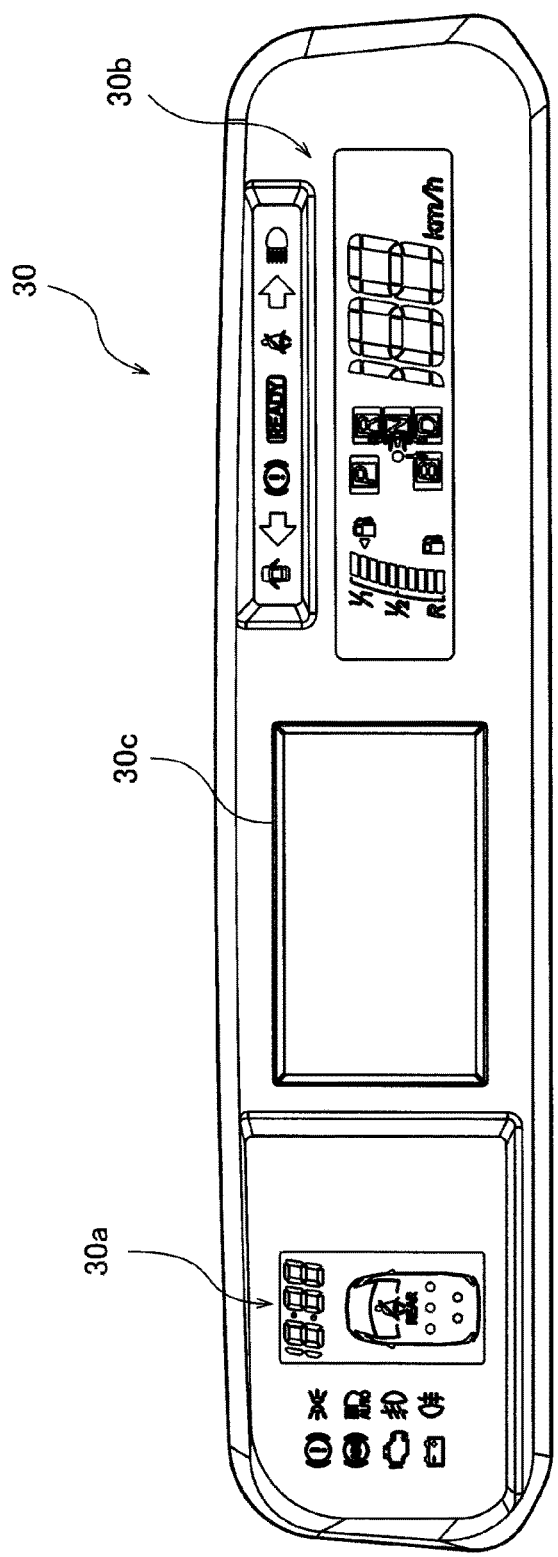
FIG. 2 is a front view of a first display device shown in FIG. 1.

FIG. 2 is a front view of the first display device 30 shown in FIG. 1. As shown in FIG. 2, the first display device 30 has a first display region 30*a* on the left side and a second display region 30*a* on the right side in the front view. The first display region 30*a* includes light indicators indicating warning associated with a brake, an engine, a battery or the like. and a light indicator indicating lighting conditions of lamps. The second display region 30*b* includes a display region for vehicle physical quantities such as a vehicle speed, a remaining fuel amount, etc., and signal lights indicating direction indicators and various kinds of warning.

The first display device 30 is has a TFT-LCD serving as a third display region 30c between the first display region 30a and the second display region 30b.

Referring again to FIG. 1 again, the second display device 40 is provided, for example, as a unit together with the operating portion 10. For example, the operating portion 10 is configured to be operated in relation to settings of an air conditioner (such as a temperature setting, an air volume and an air sending direction), and the second display device 40 is configured to display images associated with the air conditioner settings.

The in-vehicle device 50 is a device provided in the vehicle, such as an air conditioner or an audio device. The following description, an air conditioner will be described as an example of the in-vehicle device 50, and will be denoted by the same reference numeral, the air conditioner 50.

Figure 3:
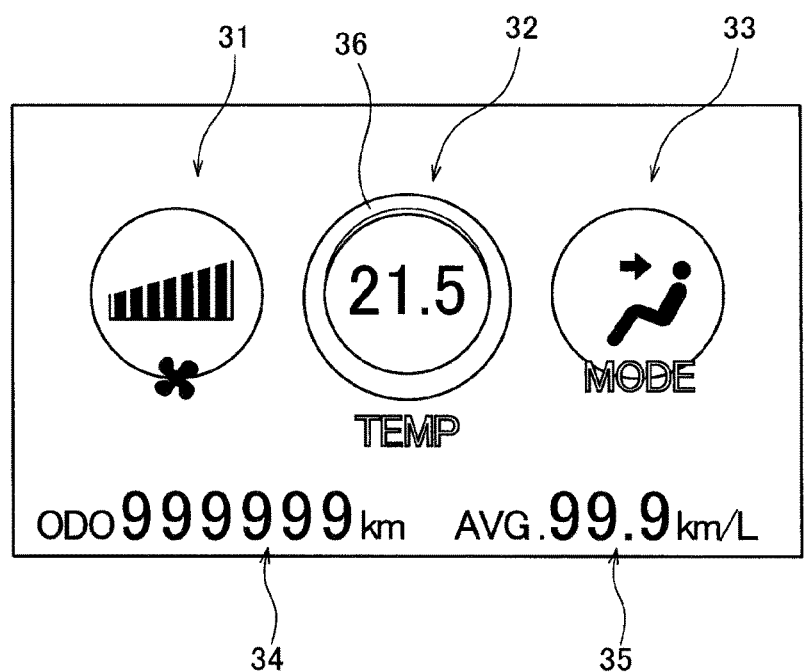
FIG. 3 is a view showing examples of images displayed in a third display region of the first display device shown in FIG. 2.

FIG. 3 is a view showing examples of images displayed in the third display region 30c of the first display device 30 shown in FIG. 1. As shown in FIG. 3, the display controller 21 controls the first display device 30 to display air condition images in the third display region 30c of the first display device 30. The air condition images may not be displayed in the third display region 30c next to and together with meter device images. For example, the air condition images may be displayed in a blank region of the second display region 30b where images indicating the vehicle speed, the remaining fuel amount and the shift position are partially or entirely erased. That is, any display method may be used as long as the air condition images may be displayed in any one of the display regions 30a, 30b, 30c of the first display device 30 (an example of a meter device).

The air condition images include an air volume image 31, a temperature setting image 32, and air direction image 33 associated with settings of air volume, temperature and air sending direction inside the vehicle. For example, the display controller 21 controls the first display device 30 to display the air volume image 31, the temperature setting image 32 and the air direction image 33 in this order from the left side when viewed from the front. Displayed below the air condition images are an odometer image 34 and a fuel efficiency image 35.

The display controller 21 also displays a frame image 36 indicating the currently selected item. In an example shown in FIG. 3, the frame image 36 is located on the temperature setting image 32. In this state, the controller 20 is in a state in which the controller 20 accepts an operation for changing the temperature setting. That is, when the operating portion 10 is further operated in this state, the temperature setting is adjusted to be higher or lower than the currently set temperature.

Figure 4:
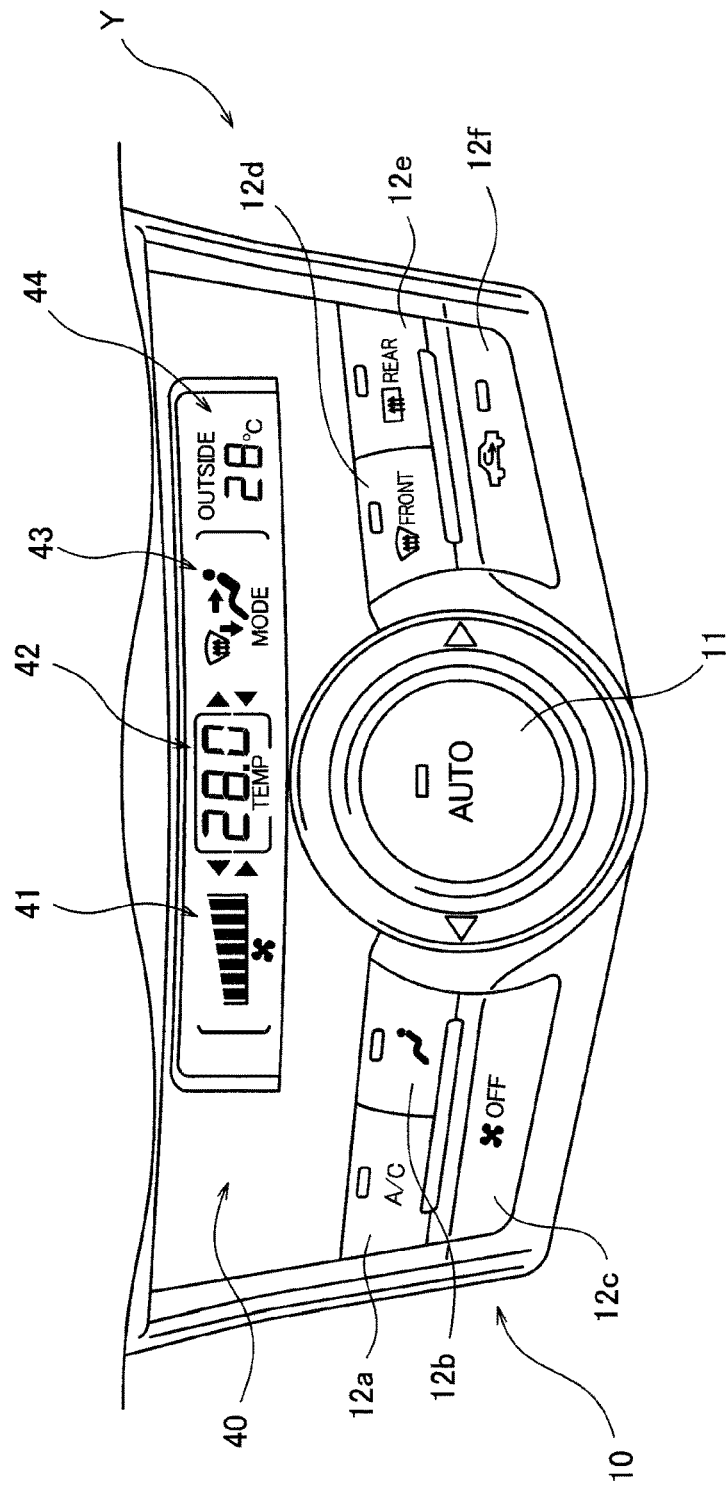
FIG. 4 is a front view showing an example of an operating portion and a second display device shown in FIG. 1.

FIG. 4 is a front view illustrating examples of the operating portion 10 and the second display device 40 shown in FIG. 1. As shown in FIG. 4, a unit Y in which the operating portion 10 and the second display device 40 are integrated is provided, for example, in a center cluster located at a center portion of an instrument panel.

The operating portion 10 is provided in a lower portion of the unit Y. The operating portion 10 includes a rotary switch 11 (an example of a directional switch) and push buttons 12a, 12b, 12c, 12d, 12e, 12f.

The rotary switch 11 is configured to enable a pressing operation at the center, right and left pressing operations, and a rotating operation.

When the center of the rotary switch 11 is pressed, a signal indicating the pressing operation is input to the controller 20, and the controller 20 determines that the air conditioner 50 has been set to a automatic mode. The controller 20 then calculates optimal conditions for a temperature set in advance, and controls the air conditioner 50 in accordance with the calculated conditions.

When the right or left portion of the rotary switch 11 is presssed, a signal indicating the pressing operation is input to the controller 20, and the controller 20 determines that an operation is performed to switch the selected item from the currently selected item to another item displayed next to the currently selected item. For example, when the left portion of the rotary switch 11 is pressed in the state shown in FIG. 3, the controller 20 determines that an operation to switch the selected item from the currently selected temperature setting to the air volume has been performed. Then, in accordance with this switching, the display controller 21 of the controller 20 controls the display contents of the first display device 30. The details of the display contents at the time of this operation will be described later with reference to FIG. 5 and FIG. 6.

When the rotary switch 11 is rotated, a signal indicating the rotating operation is input to the controller 20, and the controller 20 performs control in accordance with the rotation direction and the rotation amount of the rotating operation. For example, when the rotary switch 11 is operated counterclockwise, a temperature corresponding to the rotation amount is subtracted from the currently set temperature, and the air conditioner 50 is controlled in accordance with the lowered temperature. When the rotary switch 11 is operated clockwise, a temperature corresponding to the rotation amount is added to the currently set temperature, and the air conditioner 50 is controlled in accordance with the increased temperature. Further, when the rotary switch 11 is rotated, the display controller 21 of the controller 20 changes, for example, the displays of the temperature settings (21.5° C. in FIG. 3 and 28.0° C. in FIG. 4) displayed on the first and second display devices 30, 40.

The push buttons 12a, 12b, 12c, 12d, 12e, 12f configured as switches to be operated by pressing. In a front view, the first to third push buttons 12a, 12b, 12c are arranged on the left side of the rotary switch 11, and the fourth to sixth push buttons 12d, 12e, 12f are arranged on the right side of the rotary switch 11.

The first push button 12a is provided to turn a cooling dehumidifying function of the air conditioner 50 on and off, the second push button 12b is provided to turn a pollen removal function on and off, and the third push button 12c is provided to stop sending air. The fourth push button 12d is provided to turn a front glass defogging function on and off, the fifth push button 12e is provided to turn a rear glass defogging function on and off, and the sixth push button 12f is provided to switch between an outside air introducing mode and an inside air circulating mode.

When one of the push buttons 12a, 12b, 12c, 12d, 12e, 12f is pressed, a signal indicating the pressing operation is input to the controller 20. The controller 20 executes a control in accordance with the content associated with the push button 12a, 12b, 12c, 12d, 12e, 12f that has been pressed.

The second display device 40 is a liquid crystal display portion provided above the operating portion 10 of the unit Y. An air volume image 41 indicating a current air volume, a temperature setting image 42 indicating a currently set temperature, an air outlet image 43 indicating a currently opened air outlet, and an outside air temperature image 44 indicating a current outside air temperature are displayed on the second display device 40.

Figure 5:
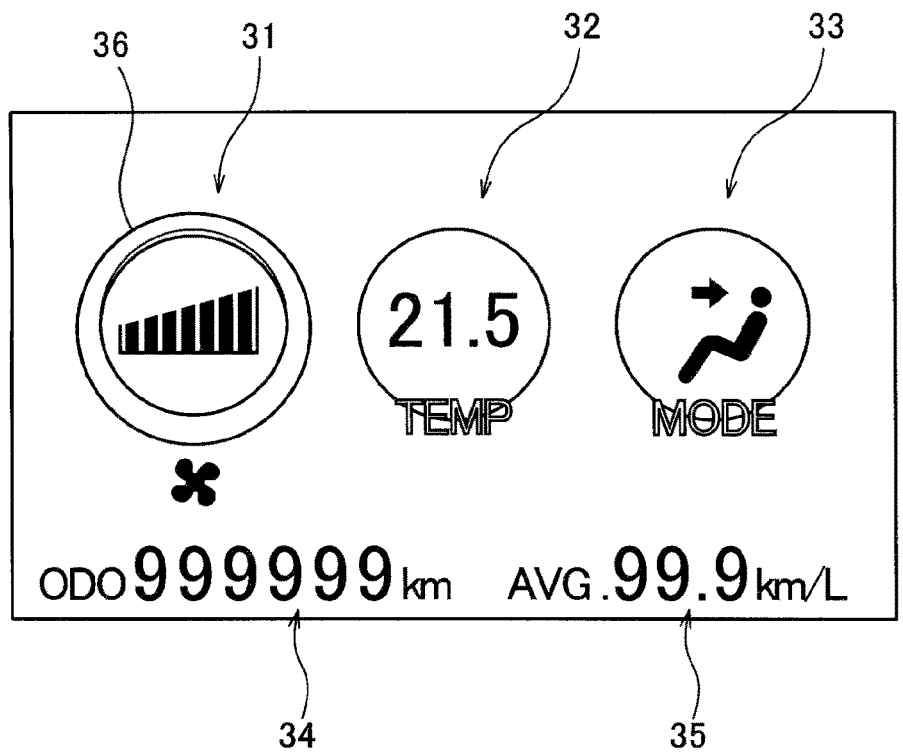
FIG. 5 is a first view showing images displayed on the first display device when left side of a rotary switch shown in FIG. 4 is pressed.

Next, a method for controlling a display when the vehicle operation display device 1 is operated will be described. FIG. 5 is a first view showing images displayed on the first display device 30 when the left side of the rotary switch 11 shown in FIG. 4 is pressed. In this example, the frame image 36 is located on the temperature setting image 32 at the middle (FIG. 3), and the left side of the rotary switch 11 is pressed in this state. By this pressing operation, the display controller 21 switches the location of the frame image 36 from the temperature setting image 32 to the air volume image 31 displayed next to the temperature setting image 32 on the left side (see FIG. 5).

However, with such a display, the feeling that the operation has been performed cannot be given. Therefore, according to an exemplary embodiment of the present invention, when switching from the view shown in FIG. 3 to the view shown in FIG. 5, the display controller 21 inserts a view shown in FIG. 6 between these displays. That is, the display controller 21 controls the first display device 30 to display the views shown in FIG. 3, FIG. 6 and FIG. 5 in this order.

Figure 6:
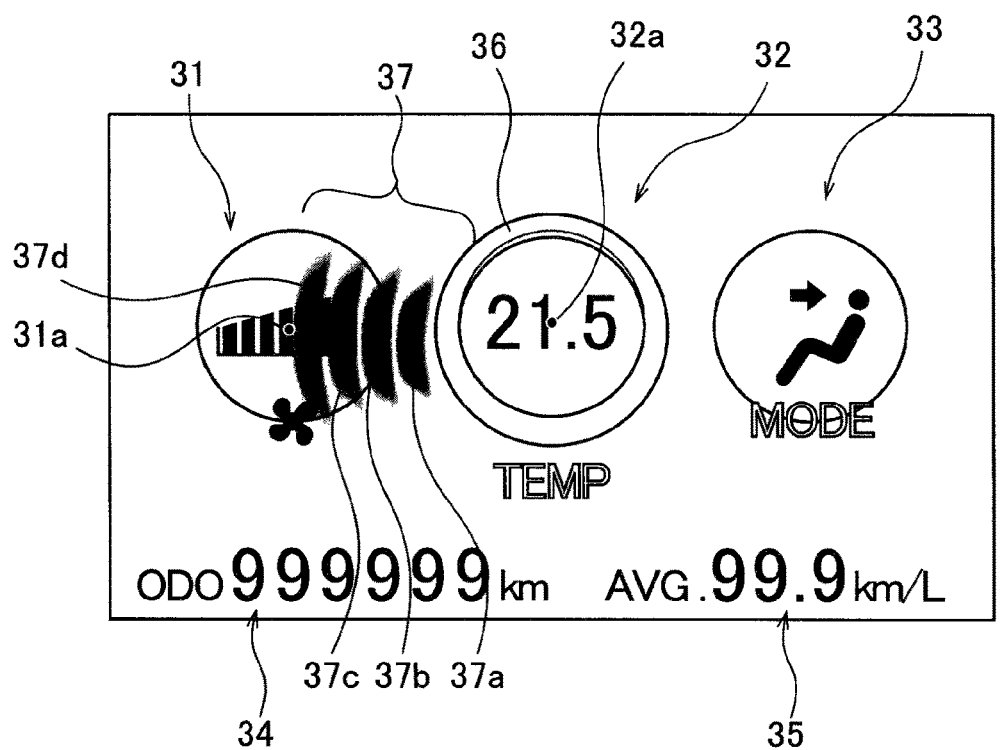
FIG. 6 is a second view showing images displayed on the first display device the left side of the rotary switch shown in FIG. 4 is pressed.

FIG. 6 is a second view showing images displayed on the first display device 30 when the left side of the rotary switch 11 shown in FIG. 4 is pressed. When the rotary switch 11 is operated to switch the selected item from the temperature (an example of the first selectable item) that is currently being selected to the air volume (an example of the second selectable item) displayed next to the temperate image on the first display device 30, the display controller 21 executes a control to display a plurality of stripe images 37 (an example of a motion image) between the temperature setting image 32 (an example of a first image of a first selectable item) and the air volume image 31 (an example of a first image of a first selectable item). The stripe images 37 indicate the switching of the selected item with a moving effect. Here, "between the images 31, 32" means "between the centers 31a, 32a of the images 31, 32". Therefore, the stripe images 37 may overlap one of the images 31, 32, for example, the image 31 as shown in FIG. 6 or may overlap both of the images 31, 32. Further, in FIG. 6, all the stripe images 37 are displayed between the centers 31a, 32a of the images 31, 32, but only a part of the stripe images 37 may be displayed between the centers 31a, 32a of the images 31, 32.

The stripe images 37 are displayed in a form of waves, and more specifically, are continuous images in which gradations toward a certain color (e.g., white color) and gradations toward a background color from the certain color are repeated. The stripe images 37 include a plurality of arcuate stripes 37a, 37b, 37c, 37d expanding radially from the center 32a of the temperature setting image 32 from which the selected image is swtiched. By displaying the stripe images 37, an operator can recognize the images indicating the switching with a moving effect. Thus, a feeling of the operation can be visually given to the operator.

The display controller 21 displays the stripe images 37 sequentially from a side of the temperature setting image 32 (selected item before the switching) toward a side of the air volume image 31 (selected item after the switching). That is, the display controller 21 firstly displays a first stripe image 37a located closest to the image 32. Next, the controller 21 also displays a second stripe image 37b, and then displays third and fourth stripe images 37c, 37d sequentially. Thus, the feeling of the operation can be visually given to the operator more expressly.

In this manner, with the vehicle operation display device 1 according to the exemplary embodiment described above, when there is an operation to switch the selected item from the currently selected item to another selectable item displayed next to the currently selected item on the first display device 30, a plurality of stripe images 37 (an example of a motion image) is displayed between the image 31 of the selectable item before the switching and the image 32 of the selectable item after the switching to indicate the switching of the selected item with a moving effect. Therefore, the operator can recognize the stripe images 37 indicating the switching with the moving effect. Thus, a feeling of the operation can be visually given to the operator.

In addition, because the stripe images 37 are displayed to be arranged between the image of the selectable item before the switching and the image of the selectable item after the switching, the images are displayed to provide an impression of switching of the selected item from the selectable item before the switching to the selectable item after the switching. Thus, a feeling of the operation can be visually given to the operator more expressly.

In addition, the display controller 21 executes a control to display air condition images including the temperature setting image 31, the air volume image 32 and the air direction image 33 within a display region of a meter device that indicates physical quantities of the vehicle. Therefore, the air condition images ire displayed together with the meter device images or displayed in a blank region where a part or all of the meter device images have been erased. The meter device images are displayed at a location where the meter device images can be visually recognized by a vehicle driver easily. Therefore, the air condition images can be also displayed at a location where the air condition images can be visually recognized by the vehicle driver easily. Thus, with regard to the movement of the selected item associated with the air conditioner settings, a feeling of the operation can be visually given to the operator more expressly.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

For example, the vehicle operation display device according to the exemplary embodiment describe above may be applied to an image display on a navigator or the like. Accordingly, the exemplary embodiment is not limited to a case where one of a plurality of selectable items associated with the air conditioner settings is selected, but may be, for example, applied to a case one of destination items in the navigator is selected.

Further, while FIG. 6 illustrates an example in which a plurality of stripe images 37 are displayed when an operation to switch the selected item from the temperature setting image 32 to the air volume image 31 is performed, the stripe images 37 may also be displayed when an operation is performed to switch the selected item from the air volume image 31 to the temperature setting image 32. It is preferable that the stripe images 37 are arranged such that the stripe 37a is displayed on a side of the selected item before the switching and that the stripe 37d is displayed on a side of the selected item after the switching. However, the stripe images 37 may be arranged reversely.

The stripe images 37 may also be displayed when an operation to switch the selected item from the temperature setting image 32 to the air sending direction image 33 when an operation is performed to switch the selected item from the air sending direction image 33 to the temperature setting image 32.

Figure 7:
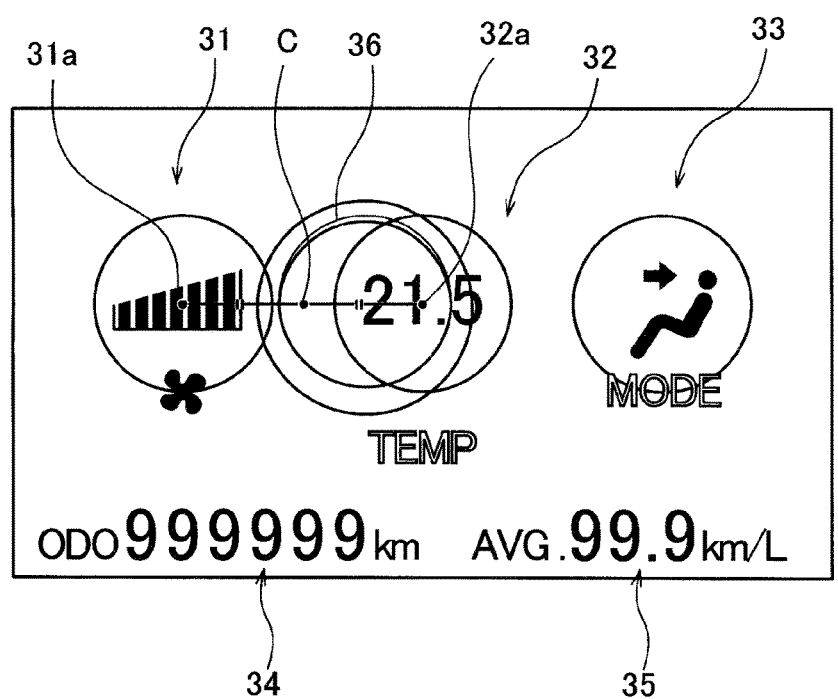
FIG. 7 is a third view showing images displayed on the first display device when the left side of the rotary switch shown in FIG. 4 is pressed.

Further, while the stripe images 37 are displayed in the exemplary embodiment described above, a different image may be displayed as a motion image. FIG. 7 is a third view showing images displayed on the first display device 30 when the left side of the rotary switch 11 shown in FIG. 4 is pressed.

For example, when switching from the display shown in FIG. 4 to the display shown in FIG. 5, the display controller 21 inserts the display shown in FIG. 7 therebetween. That is, the display controller 21 executes a control to display a frame image 36 (another example of a motion image) between the air volume image 31 and the temperature setting image 32. The display controller 21 may control the frame image 36 to be displayed at a position shifted from the middle point C between the center 31a of the air volume image 31 and the center 32a of the temperature setting image 32 (the position of the frame 36 is not necessarily shifted toward the image 32 side). This makes it possible to provide more motional effect from the temperature setting image 32 to the air volume image 33 as compared with an example in which the frame image 36 is displayed such that the center of the frame image 36 is located at the middle point C.

What is claimed is:

1. An operation display device for a vehicle comprising:
a first display device;
a display controller configured to control the first display device to display a plurality of images of selectable items on the first display device; and
a directional switch operable by an operator to select one of the selectable items,
wherein the plurality of images of selectable items includes a first image of a first selectable item and a second image of a second selectable item, the first image contains information indicative of a first operating parameter of the vehicle, the second image contains information indicative of a second operating parameter that is different from the first operating parameter, the first image and the second image being displayed next to each other on the first display device, and
wherein the display controller is configured to control the first display device to display, when the directional switch is operated by the operator to switch a selected item indicated by a frame image from the first selectable item to the second selectable item, a motion image between the first image and the second image to indicate the switching of the selected item with a moving effect on the motion image, the motion image having at least one of a different shape or pattern from the frame image,
wherein the operator can recognize the motion image indicating the switching with the moving effect, visually giving the operator a feeling of the operation of the directional switch.

2. The operation display device according to claim 1, wherein the motion image includes a plurality of stripe images arranged between the first image and the second image.

3. The operation display device according to claim 2, wherein the first display device is arranged to provide a display region of a meter device configured to indicate physical quantities associated with the vehicle, and
wherein the display controller is configured to control the first display device to display air condition images in the display region, the air condition images including, as the plurality of images of selectable images, a temperature setting image, an air volume image and an air direction image associated with settings of a temperature, an air volume and an air sending direction inside the vehicle.

4. The operation display device according to claim 1, wherein the first display device includes a first display region, a second display region spaced away from the first display region, and a third display region spaced away from each of the first and second display regions,
wherein the display controller is configured to control the first display device to display a light indicator indicating at least one of a warning and a lighting condition of a lamp in the first display region, the warning being associated with at least one of a brake, an engine, and a battery,
wherein the display controller is configured to control the first display device to display at least one of a vehicle speed, a remaining fuel amount, and signal lights indicating direction indicators in the second display region, and
wherein the display controller is configured to control the first display device to display the plurality of images of selectable items in the third display region.

5. The operation display device according to claim 1, further comprising a second display device that is separate from and spaced away from the first display device, and
wherein the directional switch is located adjacent to the second display device and spaced away from the first display device.

6. The operation display device according to claim 1, further comprising a second display device that is separate from and spaced away from the first display device,
wherein the display controller is configured to control the second display device to display a second plurality of images of selectable items on the second display device that corresponds to the plurality of images of selectable items that are displayed on the first display device.

7. The operation display device according to claim 1, wherein the display controller is configured to control the first display device to display at least one of a vehicle speed and a remaining fuel amount in addition to the plurality of images of selectable items.

8. The operation display device according to claim 1, wherein the motion image includes a plurality of stripe images, and
wherein the display controller is configured to control the first display device to display a first one of the plurality of stripe images located closest to the first image, and subsequently, sequentially display a remainder of the plurality of stripe images when the directional switch is operated to switch the selected item from the first selectable item to the second selectable item.

9. The operation display device according to claim 1, wherein the first display device comprises a liquid crystal display, and the display controller is configured to control the first display device to display the plurality of images of selectable items on the liquid crystal display.

10. The operation display device according to claim 1, wherein the first image and the second image are displayed at respective static locations that are next to each other.

11. The operation display device according to claim 1, wherein the motion image overlaps at least one of the first image and the second image.

12. The operation display device according to claim 11, wherein the motion image overlaps both the first image and the second image.

13. The operation display device according to claim 1, wherein the moving effect indicates a direction of the switching of the selected items.

14. The operation display device according to claim 1, wherein, when one of right and left portions of the directional switch is operated by the operator to switch the selected item indicated by the frame image from the first selectable item to the second selectable item, the display controller is configured to control the first display device to display the motion image between the first image and the second image to indicate the switching of the selected item with the moving effect on the motion image depending on the operation for the one of right and left portions of the directional switch.

* * * * *